Aug. 13, 1929.  J. F. FARMER  1,724,701
ANTIGLARE MOTOR VEHICLE LAMP
Filed May 21, 1927
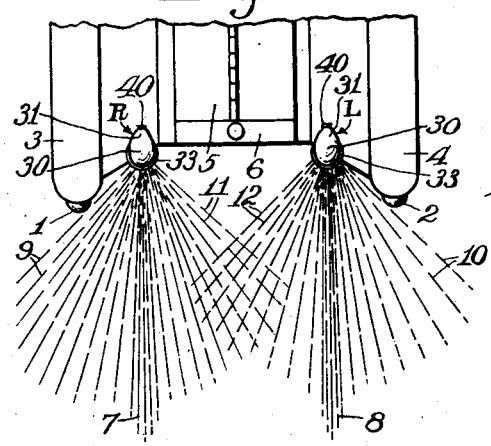
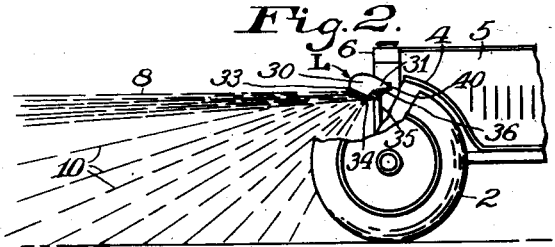
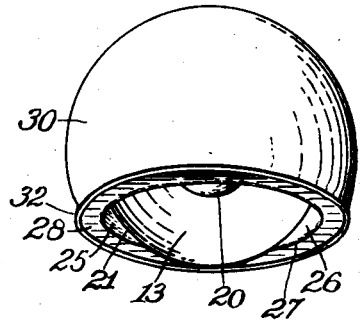
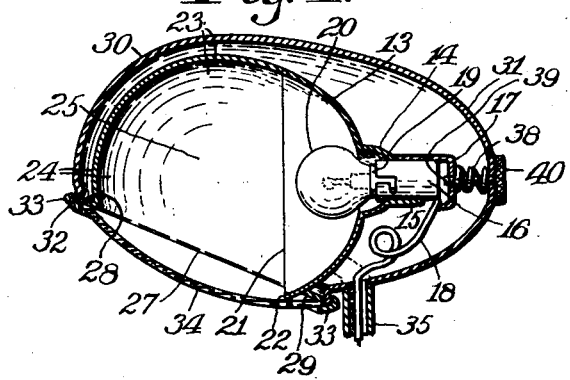
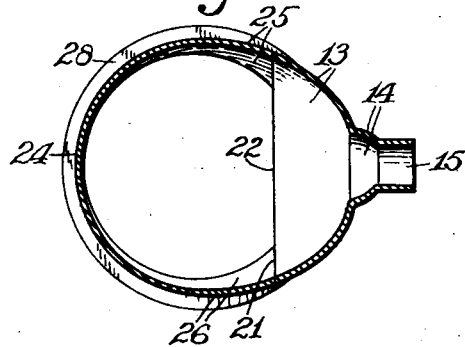
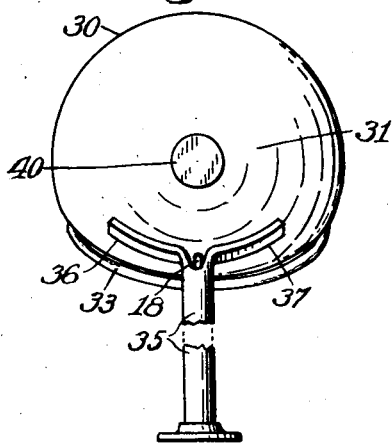
INVENTOR:
John F. Farmer,
BY E. T. Silvius,
ATTORNEY.

Patented Aug. 13, 1929.

1,724,701

UNITED STATES PATENT OFFICE.

JOHN F. FARMER, OF INDIANAPOLIS, INDIANA.

ANTIGLARE MOTOR-VEHICLE LAMP.

Application filed May 21, 1927. Serial No. 193,306.

This invention relates to motor-vehicle lamps that are designed for use more particularly as headlights whereby to afford adequate road illumination for safe night driving and without endangering motor-vehicle operators or others approaching from an opposite direction, the invention having reference more particularly to electrical lamps that are adapted for projecting strong light beams straight ahead and lower than the level of operators' eyes, while affording sufficient light a lesser distance ahead and across the road to enable an operator to safely make turns either to the right or to the left, and not cause an opposing operator to be blinded by the stronger light beams.

An object of the invention is to provide means for highly efficient illumination of roadways ahead of motor-vehicles, and at the same time protect opposing operators against dazzling light and the evil effects thereof.

Another object is to provide an improved anti-glare electric lamp which shall be of such construction as to be adapted to be used in pairs and interchangeably, or as a single headlight of relatively larger size, and which shall not be affected by rain or snow which impairs the efficiency of the common types of headlight lamps when most needed during storms.

A further object is to provide an improved reflex action lamp which shall be of simple construction and arranged in an improved manner whereby to reflect light broadly on a roadway and also project a central strong light beam far ahead on a road, while preventing an opposing driver from seeing the source of the light, and which shall be durable and economical in use.

With the above-mentioned and other objects in view, the invention consists in a lamp reflector of novel construction and arrangement for illuminating roadways in an improved and efficient manner, the invention consisting also further in an improved lamp casing and mounting thereof adapted to house and protect the reflector, the invention consisting also in the novel parts and in the combinations and arrangements of parts as hereinafter particularly described and further defined in the appended claims.

Referring to the drawings,—Figure 1 is a fragmentary top plan of the forward portion of a conventional automobile and a pair of the improved lamps applied thereto so as to illustrate their functions; Fig. 2 is a side elevation of Fig. 1 to further illustrate the functions of the improved lamps; Fig. 3 is a front view of the improved lamp minus its window glass, on an enlarged scale; Fig. 4 is a vertical central section longitudinal of the improved lamp; Fig. 5 is a horizontal section of the improved reflector taken on the focal axis and looking downward; and Fig. 6 is a rear end elevation of the lamp and its support.

Similar reference characters in the different figures of the drawings indicate corresponding elements or features of construction herein referred to in detail.

In illustration of the improved lamp and its functions the forward portion of an automobile is shown, the identifying features of which are forward wheels 1 and 2 and their fenders 3 and 4, the conventional engine hood 5 and water-cooling radiator 6. The letters "R" and "L" indicate right-hand and left-hand headlight lamps and their positions relatively to the automobile. The lamps project strong light beams 7 and 8 horizontally forward, the beams being of the character of search-light beams to light the road far ahead of the motor vehicle. The lamps also reflect moderately strong light rays 9 and 10 downwardly and outwardly on the road and also light rays 11 and 12 downwardly onto the middle portion of the road being traversed, the rays being in the nature of diffused light but sufficiently strong to enable drivers to see directly ahead and at the sides of the road.

The invention essentially includes a novel reflector and arrangement thereof, consisting preferably of a parabolic reflector portion 13 having a central depressed portion 14 from which a tubular guide 15 extends. A lamp socket 16 is arranged in the guide 15 and is longitudinally adjustable therein, being provided on its rear end with a yoke 17 for its control, a circuit wire 18 leading into the rear end of the socket as customarily. The forward portion of the socket supports the plug or shank 19 of a conventional electric lamp bulb 20 that is partially in the depressed portion 14 permitting proper focal adjustment of the source of light. For descriptive purposes the line 21 represents the edge of the reflector but as preferably constructed is invisible, the numeral 22 indicating the lowermost edge portion of the reflector. As preferably constructed the reflector has a continuous reflexing portion or reflector having the contour of a portion of a globe, there being an upper portion 23, a forward portion 24 and side portions 25 and 26, the upper and side portions continuing from the edge of the parabolic portion, the forward portion being opposite to the lamp bulb. The lower portion of the reflexing reflector is open and structurally designed so as to have a circular aperture or window-opening 27 which has an outward extending flange 28 that is inclined relatively to the focal axis of the main reflector portion, the inclination of the window frame being such that its lower portion is adjacent to the normally lower portion 22 of the parabolic reflector portion, the latter having a flange portion 29 on its back that is continuous with the flange 28, so that the lower portion 22 extends downward through the window frame. The upper portion 23 extends upwardly slightly higher than the highest edge portion of the reflector 13 and the side portions 25 and 26 extend outward from the edge of the parabolic reflector so that the diameter of the reflexing portion is horizontally greater than the diameter of the reflector 13 at its edge. Thus constructed the reflector as a whole is dome-like so as to reflect light downwardly and also forwardly and laterally through the window-opening. The window-opening preferably has a clear glass protector to guard the surface of the reflector, and the reflector may be variously supported and carried by a motor-vehicle, so that the window-opening shall be undermost. It will be observed that the reflector as a whole is approximately egg-shaped with a portion of the shell cut away to afford a window-opening below and inclined to the focal axis of the reflector.

Preferably the reflector is provided with a casing to protect it against injury, the casing preferably being generally egg-shaped but elongated more than the reflector, the larger main portion 30 of the casing conforming to globular contour and the rearward portion 31 diametrically smaller transversely. The lower forward portion has a window-opening therein and the edge of the opening has an external flared flange 32 to which a retaining band 33 is connected. The flange of the reflector is seated in the flange 32 and a concavo-convex window glass 34 is seated against the flange 28 and its extension 29 and secured in place by the band, the concave inner side of the glass permitting the lower portion 22 of the main reflector to project through the window frame which is partially composed of the flange 32 that is inclined so that the lower portion is adjacent to the lower portion 22 of the reflector.

The casing may be variously supported on a motor-vehicle, preferably by means of a hollow post 35 provided on its top with the outspread curved arms 36 and 37 that are secured to the casing behind the window frame, the circuit wire 18 being extended through the post so as to be hidden from view, the wire obviously being extended to an electric source. A coil spring 38 is arranged against the yoke 17 and the inner side of the casing, and an adjusting screw 39 is screw-threaded into the yoke and extends through the spring and the adjacent portion of the casing, the outer end of the screw having a head 40 thereon for turning the screw whereby to adjust the lamp socket 16.

In practical use the window glass is protected from being objectionably clouded by snow or rain while the reflecting surfaces are kept in good condition by the window glass, the contour of the casing being adapted to shed rain water. While the higher portions of the reflector cause diffused light to be reflected on the roadway a short distance forward of the motor-vehicle and afford sufficient light for making turns, light rays are reflected by the parabolic reflector on to the reflexing reflector which turns them back onto the parabolic reflector whereby a strong condensed beam is projected through the window and straight ahead as a search light far ahead onto the road, light from the beam illuminating the roadway, the source of the beam being invisible to opposing motor-vehicle operators.

As a slight modification of structure, because of the curvature of the major portion of the casing the inner side thereof might be made to constitute a reflexing reflector if so desired.

What is claimed is:

1. A motor-vehicle lamp having a globular sector reflector portion provided in its normally under portion with an inclined circular window, and a parabolic reflector portion opposite to the sector portion and extending downward into the lower portion of the window, the upper portions of the reflector portions together having a symmetrical dome-like contour.

2. A motor-vehicle lamp including a casing having a relatively large forward portion transversely and a window in the lower portion thereof and inclined to the horizontal, a parabolic reflector supported in the smaller portion of the casing and having its focal axis horizontally positioned higher than the higher portion of the window, a source of light in the reflector, reflexing means in the larger forward portion of the casing to turn light rays back onto the reflector, and means secured to the smaller portion of the casing to support the casing with its window wholly below the reflexing means.

3. A motor-vehicle lamp including an egg-shaped casing having a window frame in the lower portion thereof that is below the horizontal axis of the casing and inclined thereto to face forwardly, the forward portion being transversely the larger portion of the casing, a parabolic reflector arranged in the casing and projecting through the lower portion of the window frame, the reflector being in the smaller portion of the casing and facing forward, a lamp holder in the reflector, and a reflexing reflector facing towards the parabolic reflector and connected with the edge thereof, the two reflectors together being approximately egg-shaped with an opening in the lower portion thereof provided with a frame secured to the inclined window frame, the reflexing reflector having a globular contour, and a concavo-convex window glass secured to the under side of the window frame.

4. In a motor-vehicle lamp, the combination of an egg-shaped casing and a shorter egg-shaped reflector secured therein, the transversely larger portions thereof normally being forward portions, the lower portions of the larger portions of the casing and the reflector having window-openings therein and a circular window frame on an inclination relatively to the horizontal, an electrical lamp mounted in the smaller portion of the reflector, and means cooperating with the smaller portions of the casing to adjust the lamp.

In testimony whereof, I affix my signature on the 18th day of May, 1927.

JOHN F. FARMER.